UNITED STATES PATENT OFFICE.

ZENO OSTENBERG, OF SAN FRANCISCO, CALIFORNIA, ASSIGNOR TO INTERNATIONAL CELLULOSE COMPANY, OF RENO, NEVADA, A CORPORATION OF NEVADA.

PROCESS OF DISSOLVING CELLULOSE.

1,218,954.  Specification of Letters Patent.  Patented Mar. 13, 1917.

No Drawing.  Application filed January 31, 1916.  Serial No. 75,356.

*To all whom it may concern:*

Be it known that I, ZENO OSTENBERG, a citizen of the United States, and resident of San Francisco, in the county of San Francisco and State of California, have invented a certain new and useful Improvement in the Process of Dissolving Cellulose, of which the following is a specification.

My invention relates to the process of producing solutions of cellulose by dissolving cellulose in suitable mixtures of hydrochloric and sulfuric acids, or hydrochloric and phosphoric acids.

The use of highly concentrated hydrogen chlorid solution in the process of dissolving cellulose renders that process somewhat expensive, and the use of the gas renders the process inconvenient, complicated, undesirable and expensive. In my improved process I obviate the necessity of using hydrogen chlorid in the gaseous form by substituting therefor concentrated sulfuric or phosphoric acid.

Hydrochloric acid of a lower concentration than the acid of commerce (35.5% to 37.5% HCl) may be utilized in the same way by the addition of sufficient concentrated sulfuric or phosphoric acid. In fact acids ranging in concentration from 25% HCl to 39% HCl have been utilized by me. Solutions of cellulose up to 17% in concentration may be obtained by dissolving the cellulose in the proper acid mixture. The greater the concentration of hydrochloric acid the greater is the amount of cellulose dissolved. The solutions obtained are useful in the arts and sciences since the cellulose may be recovered in a number of ways or it may be allowed to hydrolyze and the glucose formed by hydrolysis may be recovered or fermented to alcohol. The mode of application of these acid mixtures is varied depending on the result desired. The following examples which are merely illustrative and in no way are to be understood as limiting my patent will serve to make clear some of its uses. The acid mixtures are made by mixing concentrated acids of commerce in vessels supplied with suitable means for cooling.

Example 1: One kilogram of air-dried cotton is kneaded with about six kilograms of a mixture of 9 parts of hydrochloric acid (37% HCl) and 1 part of concentrated sulfuric acid by weight. If hydrogen chlorid should escape the solution is suitably cooled. A thick viscid mass results which may be clarified and then forced through orifices into a suitable coagulating fluid, as water, dilute acid, solutions of various salts and various other media.

Example 2: One kilogram of air-dried cotton is kneaded with about six kilograms of a mixture of 1 volume hydrochloric (37% HCl) and 1 volume phosphoric acid 85%. A thick viscid mass results from which a large amount of the hydrogen chlorid may be recovered by suction, thus removing air bubbles at the same time. The resulting mass is then forced through orifices into a suitable coagulating media.

Example 3: Comminuted wood is intimately mixed with a sufficient quantity of a 1 part concentrated sulfuric acid, 9 parts hydrochloric acid (37% HCl content) mixture so that the amount of water present does not exceed one-fifth of the weight of cellulose or cellulose derivatives present in the wood. A portion of the cellulose dissolves and hydrolyzes at room temperature and more cellulose goes into solution and this also hydrolyzes until finally all of the cellulose is converted into dextrose (glucose). A considerable amount of the water is used up in the process and this causes a disengagement of hydrogen chlorid. As much as possible of the hydrogen chloride is recovered directly, the mass extracted by a suitable solvent, as water, and the remainder of the acid removed as completely as possible by osmosis. The solution of sugars (dextrose and pentoses) may then be used in the arts.

In the term "cellulose" is included the so-called oxycelluloses and hydrocelluloses and ligno-cellulose. Lignin is insoluble in the acid mixtures used and is left undissolved when such materials as wood is used as a cellulose containing material.

Having thus described my invention, what I claim is;—

1. The process of dissolving cellulose in a mixture of hydrochloric acid and a concentrated inorganic acid which does not react chemically with hydrochloric acid at room temperature and atmospheric temperature.

2. In the process of dissolving cellulose in highly concentrated hydrochloric acid the replacement of part of the hydrochloric acid by a concentrated inorganic acid, at room temperature and atmospheric pressure.

3. In the process of dissolving cellulose in highly concentrated hydrochloric acid the replacement of part of the hydrochloric acid by concentrated phosphoric acid.

4. The process of dissolving cellulose in a mixture of concentrated hydrochloric acid and a concentrated inorganic acid which does not react chemically with hydrochloric acid, at a temperature below 50° C.

5. The process of dissolving cellulose in a mixture of hydrochloric acid and phosphoric acid containing not less than 25% hydrogen chlorid by weight.

6. In the process of dissolving cellulose in highly concentrated hydrochloric acid the replacement of part of the hydrochloric acid by a concentrated inorganic acid at a temperature below 50° C.

7. The process of dissolving cellulose in a mixture of hydrochloric acid and phosphoric acid with an initial amount of water not to exceed one-fifth of the weight of the cellulose.

Signed at San Jose, in the county of Santa Clara and State of California, this 24th day of January, 1916.

ZENO OSTENBERG.

Copies of this patent may be obtained for five cents each, by addressing the "Commissioner of Patents Washington, D. C."